(12) United States Patent
Satou

(10) Patent No.: US 9,080,688 B2
(45) Date of Patent: Jul. 14, 2015

(54) FLOW REVERSING VALVE AND HEAT PUMP DEVICE USING SAME

(75) Inventor: Masaya Satou, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 1149 days.

(21) Appl. No.: 13/069,024

(22) Filed: Mar. 22, 2011

(65) Prior Publication Data

US 2011/0232320 A1 Sep. 29, 2011

(30) Foreign Application Priority Data

Mar. 24, 2010 (JP) ................................ 2010-068093

(51) Int. Cl.

| F16K 31/12 | (2006.01) |
|---|---|
| F16K 11/074 | (2006.01) |
| F16B 13/04 | (2006.01) |
| F16K 31/124 | (2006.01) |
| F16K 11/044 | (2006.01) |
| F16K 31/04 | (2006.01) |
| F16K 31/05 | (2006.01) |
| F16K 15/18 | (2006.01) |

(52) U.S. Cl.
CPC ............. F16K 31/124 (2013.01); F16K 11/044 (2013.01); *F16K 15/186* (2013.01); *F16K 31/041* (2013.01); *F16K 31/055* (2013.01)

(58) Field of Classification Search
CPC .... F16K 31/055; F16K 15/186; F16K 31/041

USPC ............ 137/625.43, 625.63, 625.6; 62/324.6; 251/41, 30.01, 30.02, 30.04, 30.05
See application file for complete search history.

(56) References Cited

U.S. PATENT DOCUMENTS

| 6,869,060 B2 * | 3/2005 | Barber et al. ............... 251/30.02 |
| 7,621,211 B2 * | 11/2009 | Ma et al. .......................... 91/446 |
| 2004/0060308 A1 * | 4/2004 | Yoshizawa et al. ............. 62/160 |

FOREIGN PATENT DOCUMENTS

| JP | 03-288071 | * 12/1991 |
| JP | 06-235467 | 8/1994 |
| JP | 2006-071148 | 3/2006 |

* cited by examiner

*Primary Examiner* — Frantz Jules
*Assistant Examiner* — Steve Tanenbaum
(74) *Attorney, Agent, or Firm* — McCarter & English

(57) ABSTRACT

A flow reversing valve includes a reversing valve main body adapted to assume a first circulatory state where a first main valve part is in a fully-open state and a second main valve part is in a fully-closed state and a second circulatory state where the first main valve part is in a fully-closed state and the second main valve part is in a fully-open state; and a flow regulating valve adapted to regulate the pressures of the respective back pressure chambers and of the first main valve part and the second main valve part. The flow regulating valve places the reversing valve main body in the first circulatory state by gradually reducing the pressure of the back pressure chamber of the first main valve part, and in the second circulatory state by gradually reducing the pressure of the back pressure chamber of the second main valve part.

11 Claims, 12 Drawing Sheets

< During cooling operation >

< During heating operation >

< During cooling operation >

< During heating operation >

FLOW REVERSING VALVE AND HEAT PUMP DEVICE USING SAME

CROSS-REFERENCE TO RELATED APPLICATIONS

This application claims priority to Japanese Patent Application No. 2010-068093, filed Mar. 24, 2010, all of which is herein incorporated by reference in its entirety.

FIELD OF THE INVENTION

The present invention relates to a flow reversing valve, such as a three-way reversing valve, etc., that changes the flow direction of a fluid, and to a heat pump device using same.

BACKGROUND OF THE INVENTION

Heat pump devices (air conditioners, etc.) generally comprise a four-way reversing valve as a flow path (flow direction) reversing means in addition to a compressor, a vapor-liquid separator, a condenser (outdoor heat exchanger), an evaporator (indoor heat exchanger), an expansion valve, etc. (see JP Patent Publication (Kokai) No. 2001-295951 A (Patent Document 1), etc.).

However, with such heat pump devices employing a four-way reversing valve, since a high-temperature and high-pressure refrigerant and a low-temperature and low-pressure refrigerant flow in close proximity to each other within the four-way reversing valve, there is a problem in that the amount of heat transferred (heat transfer amount) from the high-temperature and high-pressure refrigerant to the low-temperature and low-pressure refrigerant becomes greater, thereby causing non-negligible heat loss and a drop in thermal efficiency.

SUMMARY OF THE INVENTION

The present inventors have contemplated having the flow reversing function of the four-way reversing valve provided by way of two three-way reversing valves instead. A schematic cycle example of such a heat pump device employing two three-way reversing valves is shown in FIGS. 9A and 9B. The heat pump device 200 in the illustrated example comprises a compressor 210, a vapor-liquid separator (not shown), a condenser (outdoor heat exchanger) 220, an evaporator (indoor heat exchanger) 230, an expansion valve 250, etc. Further, a first three-way reversing valve 100A is disposed between the discharge side of the compressor 210 and the condenser 220, and a second three-way reversing valve 100B is disposed between the evaporator 230 and the suction side of the compressor 210.

The first three-way reversing valve 100A comprises one inlet 11 and two outlets 12A and 12B, and is so arranged as to be capable of assuming a first A circulatory state, in which the inlet 11 and the outlet 12A are connected while the inlet 11 and the outlet 12B are disconnected, and a second A circulatory state in which the inlet 11 and the outlet 12A are disconnected while the inlet 11 and the outlet 12B are connected.

The second three-way reversing valve 100B comprises two inlets 11A and 11B and one outlet 12, and is so arranged as to be capable of assuming a first B circulatory state, in which the inlet 11A and the outlet 12 are connected while the inlet 11B and the outlet 12 are disconnected, and a second B circulatory state in which the inlet 11A and the outlet 12 are disconnected while the inlet 11B and the outlet 12 are connected.

With this heat pump device 200, during cooling operation, as shown in FIG. 9A, the first three-way reversing valve 100A assumes the first A circulatory state, and the second three-way reversing valve 100B assumes the first B circulatory state. Thus, the refrigerant discharged from the compressor 210 flows as follows: the inlet 11 of the first three-way reversing valve 100A the outlet 12A of the first three-way reversing valve 100A→the condenser 220 the expansion valve 250→the evaporator 230 the inlet 11A of the second three-way reversing valve 100B→the outlet 12 of the second three-way reversing valve 100B→the suction side of the compressor 210.

In contrast, during heating operation, as shown in FIG. 9B, the first three-way reversing valve 100A assumes the second A circulatory state, and the second three-way reversing valve 100B assumes the second B circulatory state. Thus, the refrigerant discharged from the compressor 210 flows as follows: the inlet 11 of the first three-way reversing valve 100A→the outlet 12B of the first three-way reversing valve 100A→the evaporator 230→the expansion valve 250→the condenser 220→the inlet 11B of the second three-way reversing valve 100B→the outlet 12 of the second three-way reversing valve 100B→the suction side of the compressor 210.

In general, the flow reversing valves, such as conventional three-way reversing valves, etc., employed in the above-mentioned conventional heat pump device, etc., are ordinarily of an electromagnetic type (i.e., a type in which a plunger valve member is attracted by a solenoid). Thus, the reversing (opening/closing) operation is extremely fast, lasting only a few hundred milliseconds, and there is a possibility that, due to the speed of the reversing operation thereof, flood backs (a phenomenon where the refrigerant is returned to the compressor, etc., while still partially in liquid form), impact sounds, etc., might occur, causing system failures in extreme cases.

In addition, with electromagnetic valves, since it is necessary to continue applying a current even after the flow has been reversed, there are such problems as greater power consumption, etc.

The present invention is made in view of the circumstances above, and an object thereof is to provide a flow reversing valve, such as a three-way reversing valve, etc., that is capable of gently performing a reversing operation, of effectively suppressing occurrences of flood backs, impact sounds, etc., and of reducing power consumption relative to electromagnetic valves, as well as to provide a heat pump device using same.

In order to achieve the object above, one flow reversing valve according to the present invention basically comprises: a reversing valve main body comprising a first main valve part and a second main valve part, each of which is configured as a two-way valve, the reversing valve main body being so arranged as to be capable of assuming a first circulatory state, where the first main valve part is in a fully open state and the second main valve part is in a fully closed state, and a second circulatory state, where the first main valve part is in a fully closed state and the second main valve part is in a fully open state; and a pressure regulating means that serves as a pilot valve for the first main valve part and the second main valve part.

Another flow reversing valve according to the present invention comprises: a reversing valve main body comprising a first main valve part and a second main valve part, each being formed with an inlet, an outlet, a valve chamber, and a back pressure chamber, the reversing valve main body being so arranged as to be capable of assuming a first circulatory state, where the first main valve part is in a fully open state and the second main valve part is in a fully closed state, and a second circulatory state, where the first main valve part is in a fully closed state and the second main valve part is in a fully open state; and back pressure regulating means configured to regulate the respective pressures of the back pressure chambers of the first main valve part and the second main valve part, wherein the back pressure regulating means is so arranged as to cause the reversing valve main body to assume the first circulatory state by gradually reducing the pressure of the back pressure chamber of the first main valve part, and to assume the second circulatory state by gradually reducing the pressure of the back pressure chamber of the second main valve part.

Preferably, the first main valve part and the second main valve part each comprise a tubular main valve case with a base. The main valve case is provided with a main valve seat having a main valve opening, and a main valve member that opens/closes the main valve opening is fitted in the main valve case in a freely slidable manner. A main valve chamber is formed between the main valve seat and the main valve member, an inlet that opens into the main valve chamber is formed, and an outlet is formed downstream of the main valve opening. A back pressure chamber is formed between a base part of the main valve case and the main valve member, and a pressure equalizing hole that places the main valve chamber and the back pressure chamber in communication with each other is provided in the main valve member.

In this case, a valve closing spring that constantly biases the main valve member in the valve closing direction is preferably disposed in the respective back pressure chambers of the first main valve part and the second main valve part.

The back pressure regulating means preferably comprises a single flow regulating valve or two flow regulating valves that is/are capable of regulating the respective amounts of fluid to be released to the outlet from the back pressure chambers of the first main valve part and the second main valve part.

On the other hand, a heat pump device according to the present invention comprises: a compressor; a condenser; an evaporator; and an expansion valve, wherein a first flow reversing valve of the structure above is disposed between the discharge side of the compressor and the condenser, and a second flow reversing valve of the structure above is disposed between the evaporator and the suction side of the compressor.

In this case, in a more preferable embodiment, with respect to the first flow reversing valve, the inlet of the first main valve part and the inlet of the second main valve part are both connected to the discharge side of the compressor, and one of the outlet of the first main valve part and the outlet of the second main valve part is connected to the condenser while the other is connected to the evaporator. With respect to the second flow reversing valve, one of the inlet of the first main valve part and the inlet of the second main valve part is connected to the condenser while the other is connected to the evaporator, and the outlet of the first main valve part and the outlet of the second main valve part are both connected to the suction side of the compressor.

In a preferred embodiment of a flow reversing valve according to the present invention, the first circulatory state is assumed by reducing the pressure of the back pressure chamber of the first main valve part, and the second circulatory state is assumed by reducing the pressure of the back pressure chamber of the second main valve part. Thus, with respect to the first main valve part and the second main valve part, the transition from a fully closed state to a fully open state and the transition from a fully open state to a fully closed state (main valve opening/closing operation), as well as the switch from the first circulatory state to the second circulatory state and the switch from the second circulatory state to the first circulatory state (flow reversing operation) can all be performed gently. As a result, it is possible to effectively suppress occurrences of flood backs, impact sounds, etc., and to thereby prevent system failures, etc., with respect to heat pump devices, etc., that employ the flow reversing valve above.

In addition, since there is no need to apply, after flow reversal, a current to the back pressure regulating means comprising the flow regulating valve(s), etc., it is possible to reduce power consumption relative to those of an electromagnetic type.

Further, since the back pressure regulating means comprising the flow regulating valve(s), etc., is so arranged as to serve as a pilot valve with respect to both main valve parts, flow reversal can be carried out with a smaller driving force as compared to those of the conventional electromagnetic type, it is possible to reduce energy consumption, such as power consumption, etc., from this point as well.

Figure 1:
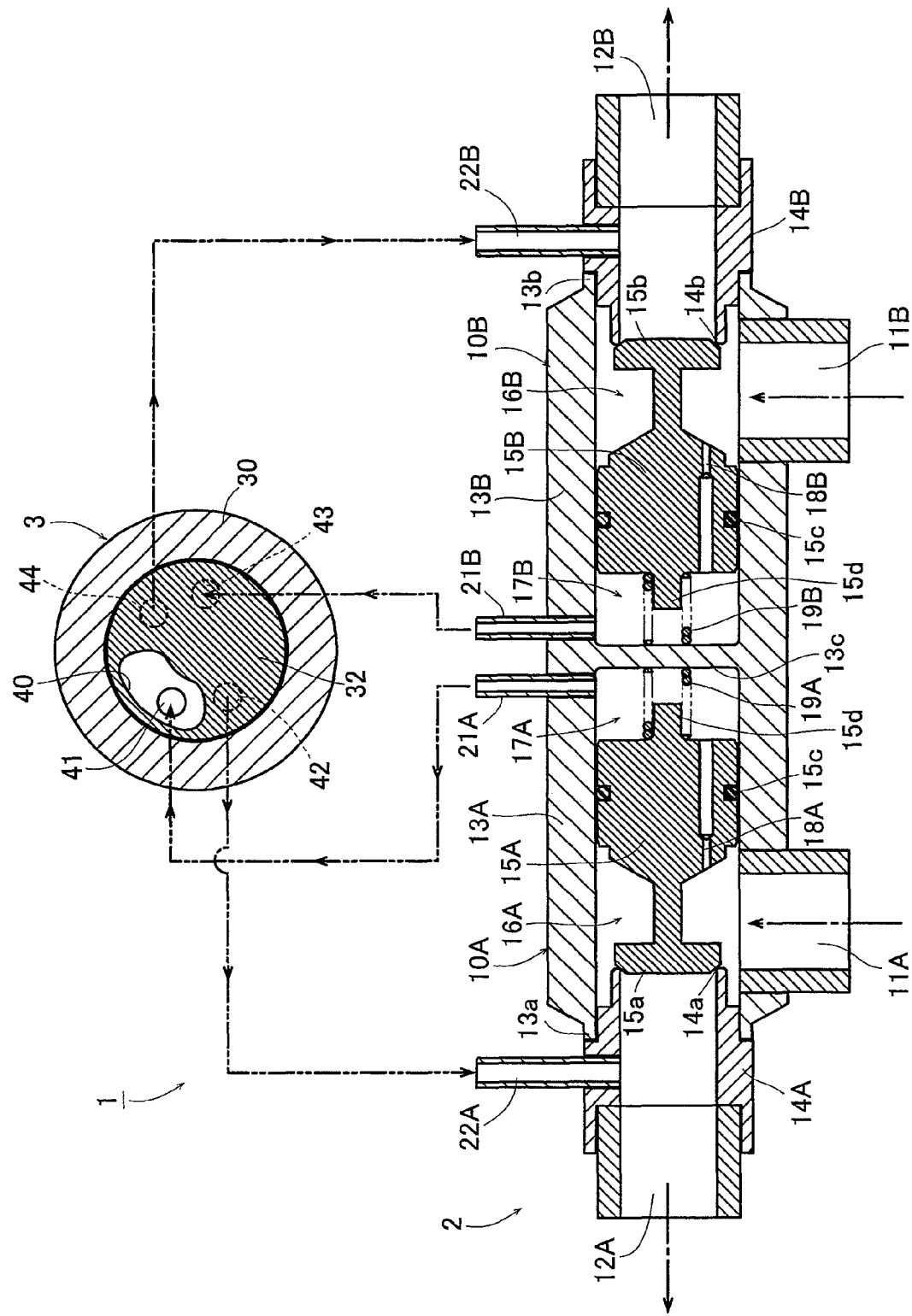
FIG. 1 is a schematic configuration diagram showing one embodiment of a flow reversing valve according to the present invention.

DESCRIPTION OF FIGURE ELEMENTS 1 (1A, 1B) Flow reversing valve (three-way reversing valve)
2 Reversing valve main body
3 Flow regulating valve
10A, 10B Main valve part
11A, 11B Inlet
12A, 12B Outlet
13A, 13B Main valve case
14A, 14B Main valve seat
15A, 15B Main valve member
16A, 16B Main valve chamber
17A, 17B Back pressure chamber
18A, 18B Pressure equalizing hole
19A, 19B Valve closing spring
21A, 21B Escape port
22A, 22B Discharge port
30 Valve housing 32 Rotary valve member
35 Stepping motor
37 Rotor
38 Stator
40 Communicating channel
41 First port
42 Second port
43 Third port
44 Fourth port
200, 200' Heat pump device
210 Compressor
220 Condenser
230 Evaporator
250 Expansion valve

DETAILED DESCRIPTION OF THE INVENTION

Embodiments of a flow reversing valve of the present invention are described below with reference to the drawings.

Figures 2A, 2B:
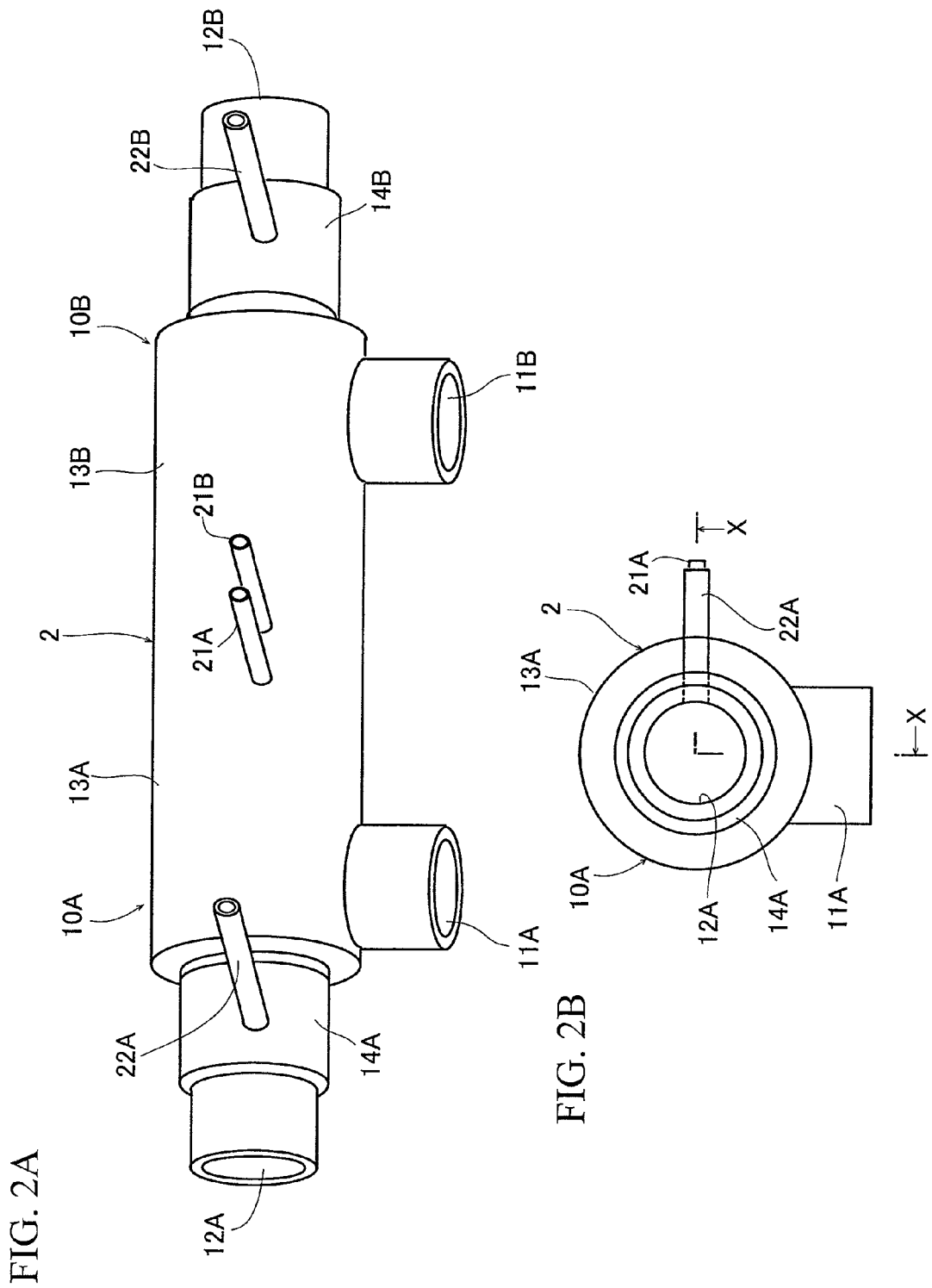
FIG. 2A is an external perspective view of the reversing valve main body shown in FIG. 1.
FIG. 2B is a side view of the reversing valve main body shown in FIG. 2A as seen from the left.
Figure 3A:
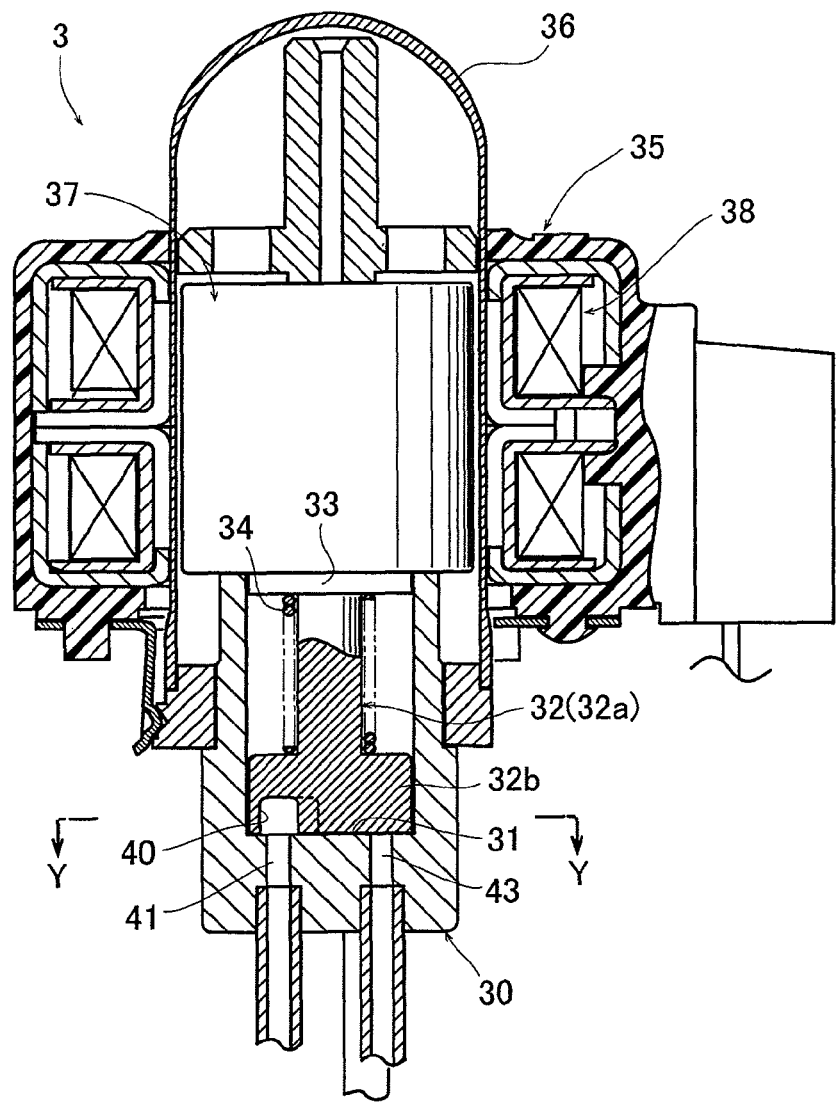
FIG. 3A is a partially cutaway sectional view of the flow regulating valve shown in FIG. 1.
Figure 3B:
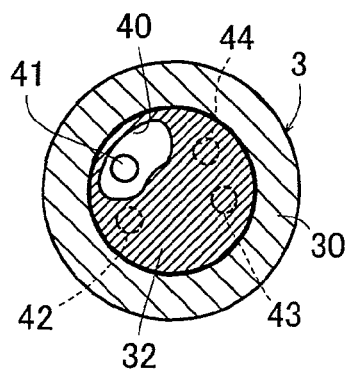
FIG. 3B is a sectional view taken along and as viewed in the direction of arrows Y-Y in FIG. 3A.

FIG. 1 is a schematic configuration diagram showing one embodiment of a flow reversing valve according to the present invention. The flow reversing valve 1 shown in the diagram comprises a reversing valve main body 2 and a flow regulating valve 3. FIG. 2A is an external perspective view of the reversing valve main body 2 shown in FIG. 1, and FIG. 2B is a side view of the reversing valve main body 2 shown in FIG. 2A as viewed from the left. FIG. 3A is a partially cutaway sectional view of the flow regulating valve 3 shown in FIG. 1, and FIG. 3B is a sectional view taken along and as viewed in the direction of arrows Y-Y in FIG. 3A. It is noted that the reversing valve main body 2 portion of FIG. 1 is a sectional view taken along and as viewed in the direction of arrows X-X in FIG. 2B, and the flow regulating valve 3 portion of FIG. 1 is identical to FIG. 3B.

Figure 9A:
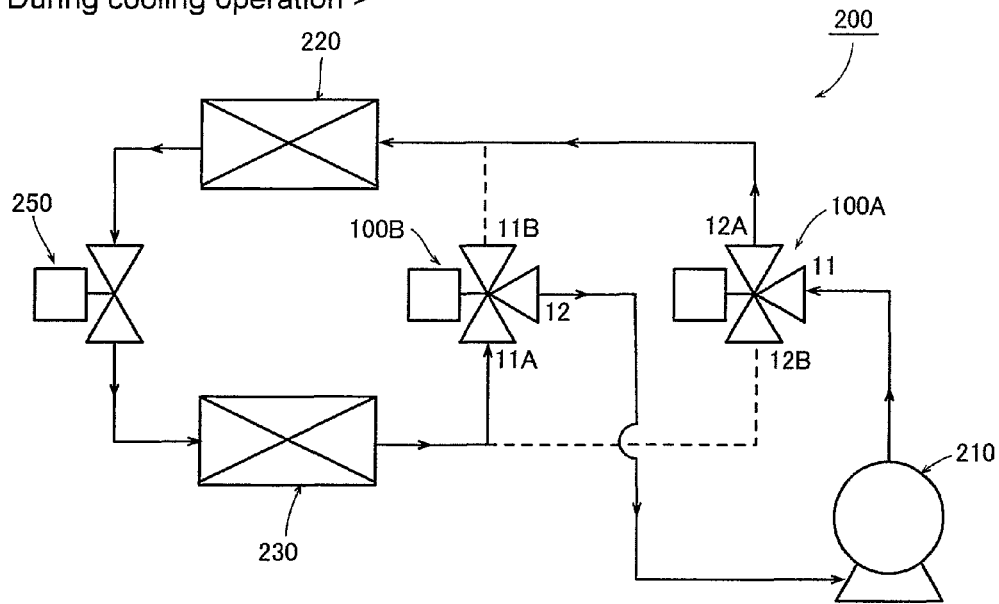
FIGS. 9A and 9B are diagrams showing schematic cycle examples of a heat pump device employing two three-way reversing valves.
Figure 9B:
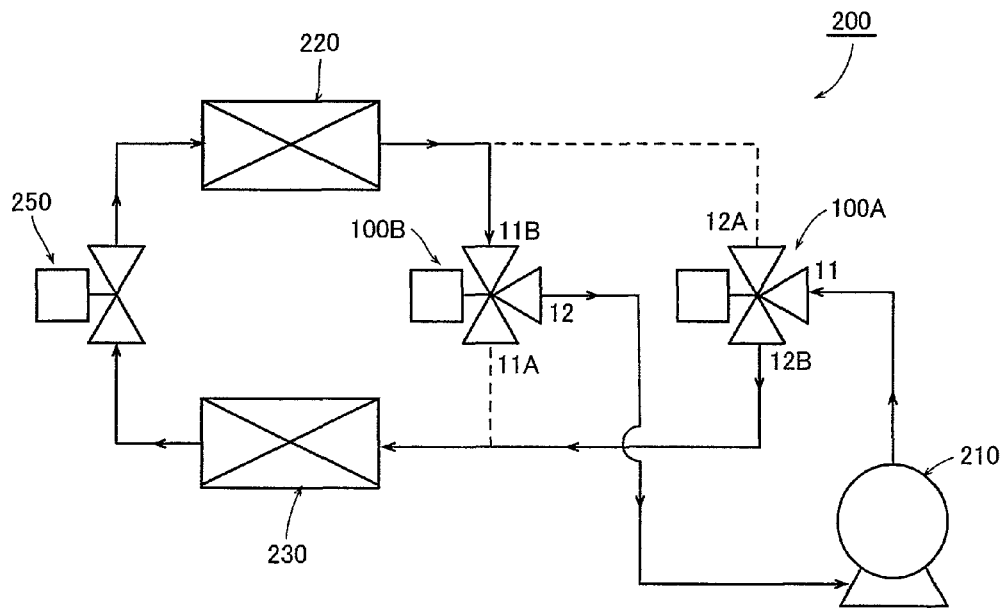

The flow reversing valve 1 of the present embodiment has been developed for use as a three-way reversing valve in a heat pump device such as that shown in FIGS. 9A and 9B mentioned above (details will be discussed later with reference to FIGS. 4A and 4B). It basically comprises: the reversing valve main body 2 comprising a first main valve part 10A and a second main valve part 10B which are arranged symmetrically on the left and right and configured as two-way valves; and the flow regulating valve 3 of an electric motor type (rotary type), which serves as a pilot valve (back pressure regulating means) with respect to the first main valve part 10A and the second main valve part 10B.

The first main valve part 10A and the second main valve part 10B of the reversing valve main body 2 respectively comprise cylindrical main valve cases 13A and 13B each having a base. The main valve cases 13A and 13B are integrated back to back so as to share a base part 13c, and their tip parts 13a and 13b are open. Main valve seats 14A and 14B that respectively have main valve openings 14a and 14b are respectively provided at the tip parts 13a and 13b of the main valve cases 13A and 13B. Main valve members 15A and 15B that respectively have poppet parts 15a and 15b for opening/closing the respective main valve openings 14a and 14b are fitted within the respective main valve cases 13A and 13B in a freely slidable manner. Seal materials 15c and 15c for suppressing or sealing leaks are provided on the outer circumferences of the main valve members 15A and 15B. Further, a protruding stopper 15d for restricting the fully open position is provided at the rear end face of each of the main valve members 15A and 15B.

Main valve chambers 16A and 16B are respectively formed between the main valve seats 14A and 14B (main valve openings 14a and 14b) and the main valve members 15A and 15B of the respective main valve cases 13A and 13B. Inlets 11A and 11B, through which a fluid, such as a refrigerant, etc., is introduced, open into the respective main valve chambers 16A and 16B. Outlets 12A and 12B through which the fluid is led out are respectively formed downstream of the main valve openings 14a and 14b.

Further, back pressure chambers 17A and 17B are respectively formed between the base part 13c and the main valve members 15A and 15B of the respective main valve cases 13A and 13B. Pressure equalizing holes 18A and 18B that respectively communicate the main valve chambers 16A and 16B with the back pressure chambers 17A and 17B are formed in the respective main valve members 15A and 15B. Further, valve closing springs 19A and 19B comprising compression coil springs that constantly bias the respective main valve members 15A and 15B in the valve closing direction are provided, in a compressed manner, between the respective main valve members 15A and 15B and the base part 13c within the back pressure chambers 17A and 17B.

The reversing valve main body 2 thus constructed is capable of assuming a first circulatory state, where the first main valve part 10A is placed in a fully open state by moving the main valve member 15A away from the main valve seat 14A and the second main valve part 10B is placed in a fully closed state by seating the main valve member 15B in the main valve seat 14B, and a second circulatory state, where the first main valve part 10A is placed in a fully closed state by seating the main valve member 15A in the main valve seat 14A and the second main valve part 10B is placed in a fully open state by moving the main valve member 15B away from the main valve seat 14B.

In the first circulatory state, the inlet 11A and the outlet 12A of the first main valve part 10A are in communication with each other, while the path between the inlet 11B and the outlet 12B of the second main valve part 10B is blocked. In the second circulatory state, the path between the inlet 11A and the outlet 12A of the first main valve part 10A is blocked, while the inlet 11B and the outlet 12B of the second main valve part 10B are in communication with each other.

On the other hand, the flow reversing valve 1 of the present embodiment comprises a back pressure regulating means that regulates the pressure of each of the back pressure chambers 17A and 17B of the respective first main valve part 10A and the second main valve part 10B.

The back pressure regulating means comprises: escape ports 21A and 21B respectively provided in the back pressure chambers 17A and 17B; discharge ports 22A and 22B respectively provided in the main valve seats 14A and 14B (downstream of the main valve openings 14a and 14b); and the flow regulating valve 3.

As shown in FIG. 3A, the flow regulating valve 3 comprises: a tubular valve housing 30 with a base and having a valve seat part 31; a can 36 whose lower end part is sealingly joined with the valve housing 30; a stepping motor 35 comprising a rotor 37 disposed on the inner circumferential side of the can 36 and a stator 38 that is externally fitted and fixed on the outer circumference of the can 36; and a rotary valve member 32 of an inverted T-shaped cross-section, which is rotated by this stepping motor 35.

With respect to the rotary valve member 32, a vertical part 32a thereof is rotatably supported by a guide member 33 that is affixed to the upper portion of the valve housing 30, and the lower end face thereof is pressed strongly against the valve seat part 31 by way of the biasing force of a compression coil spring 34 disposed between a lower part 32b of the rotary valve member 32 and the guide member 33.

There are provided in the valve seat part 31 and such that they lie on the circumference of the same circle: a first port 41 and a second port 42 to which the escape port 21A and the discharge port 22A provided in the first main valve part 10A are to be connected, respectively; and a third port 43 and a fourth port 44 to which the escape port 21B and the discharge port 22B provided in the second main valve part 10B are to be connected, respectively. By way of example, the positional relationship among the ports may be such that the second port 42 is provided at an anti-clockwise angular interval of approximately 60 degrees relative to the first port 41, the third port 43 is provided at an anti-clockwise angular interval of approximately 140 degrees relative to the second port 42, the fourth port 44 is provided at an anti-clockwise angular interval of approximately 60 degrees relative to the third port 43, and the angular interval between the fourth port 44 and the first port 41 is approximately 100 degrees.

Further, in the lower half part of the lower part 32b of the valve member 32 is provided a communicating channel 40 for selectively placing the first port 41 and the second port 42 or the third port 43 and the fourth port 44 in communication with each other, the communicating channel 40 having an open lower face and being of a fan-shape with rounded corners in planar view (the central angle being approximately 90 degrees).

The flow regulating valve 3 thus structured is so arranged as to rotate the rotary valve member 32 relatively slowly by regulating the excitation speed of the stator 38, for example. It is noted that for such purposes as reducing the rotation speed of the rotary valve member 32 or obtaining a high torque, it is possible to employ, besides the above, such methods as installing a gear reduction mechanism between the rotor 37 and the rotary valve member 32, and so forth.

Next, the operation of the flow reversing valve 1 thus structured will be described with reference to FIGS. 5A-5D through FIGS. 7A-7D and to the timing diagrams in FIG. 8.

Figure 5A:
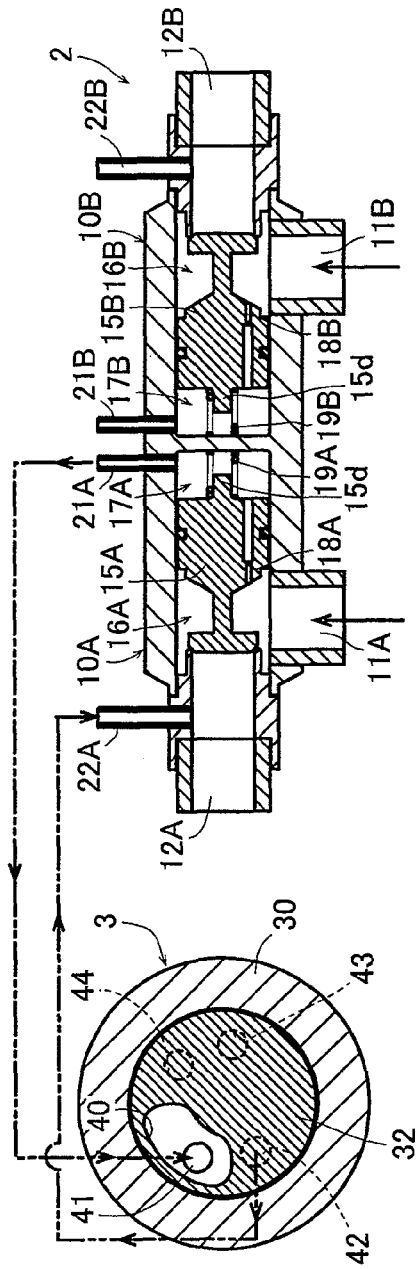
FIGS. 5A through 5D are diagrams illustrating the operation of the flow reversing valve shown in FIG. 1.

As shown in FIG. 5A, in a state where the rotary valve member 32 only opens the first port 41, that is, in a state where none of the first port 41 and the second port 42, as well as the third port 43 and the fourth port 44, are in communication with one another, the refrigerant in the respective back pressure chambers 17A and 17B of the first main valve part 10A and the second main valve part 10B is not discharged. Thus, for both main valve parts 10A and 10B, the forces acting on the main valve members 15A and 15B in the valve closing direction (i.e., the pressures of the back pressure chambers 17A and 17B+the biasing forces of the valve closing springs 19A and 19B) are greater than the forces acting in the valve opening direction (i.e., pressures Pa of the main valve chambers 16A and 16B). In other words, because the refrigerant is, via the pressure equalizing holes 18A and 18B, gradually introduced into the respective back pressure chambers 17A and 17B of both main valve parts 10A and 10B from the valve chambers 16A and 16B, the pressures of the back pressure chambers 17A and 17B become approximately equal to pressures Pa of the valve chambers 16A and 16B, the main valve members 15A and 15B are pressed against the respective main valve seats 14A and 14B due to the biasing forces of the valve closing springs 19A and 19B, and both the first main valve part 10A and the second main valve part 10B are placed in a fully closed state. This state corresponds to the state before time t1 in FIG. 8, that is, a state where the effective opening areas of the escape ports 21A and 21B are 0, the pressures of the back pressure chambers 17A and 17B are equal to pressures Pa of the valve chambers 16A and 16B, and the opening in both main valve parts 10A and 10B is 0.

Figure 5B:
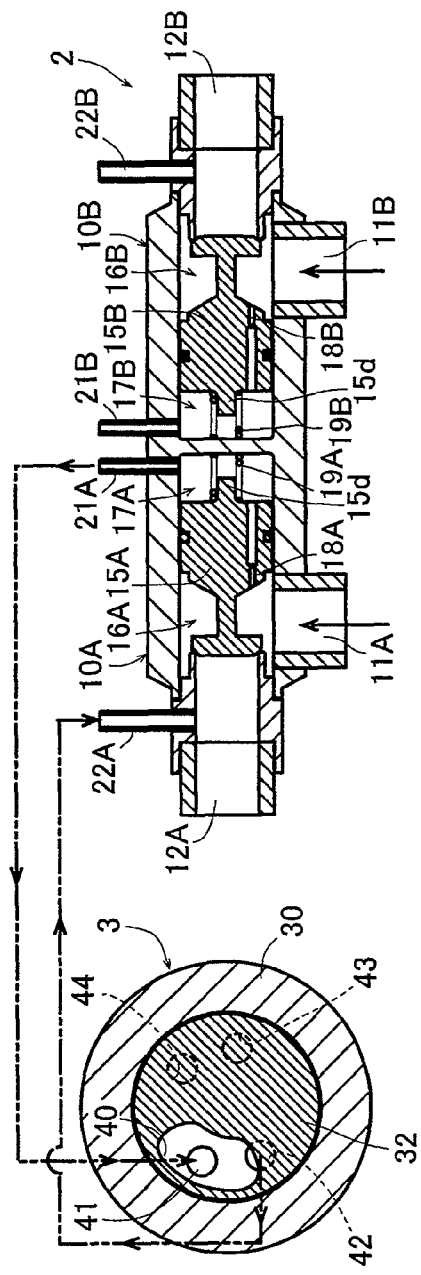

As the rotary valve member 32 is rotated anti-clockwise from the state shown in FIG. 5A and the second port 42 is slightly opened as shown in FIG. 5B, the first port 41 and the second port 42 are placed in communication with each other via the communicating channel 40. At this point, the opening area of the second port 42 becomes the effective opening area of the escape port 21A. Thus, the refrigerant within the back pressure chamber 17A flows as follows and the pressure of the back pressure chamber 17A drops slightly: escape port 21A→22 first port 41→communicating channel 40→second port 42→discharge port 22A→outlet 12A. However, since, at this point, the force acting in the valve closing direction is still greater than the force acting in the valve opening direction, the first main valve part 10A remains in a fully closed state. This period between FIGS. 5A and 5B corresponds to the period between times t1 and t2 in FIG. 8.

Figure 5C:
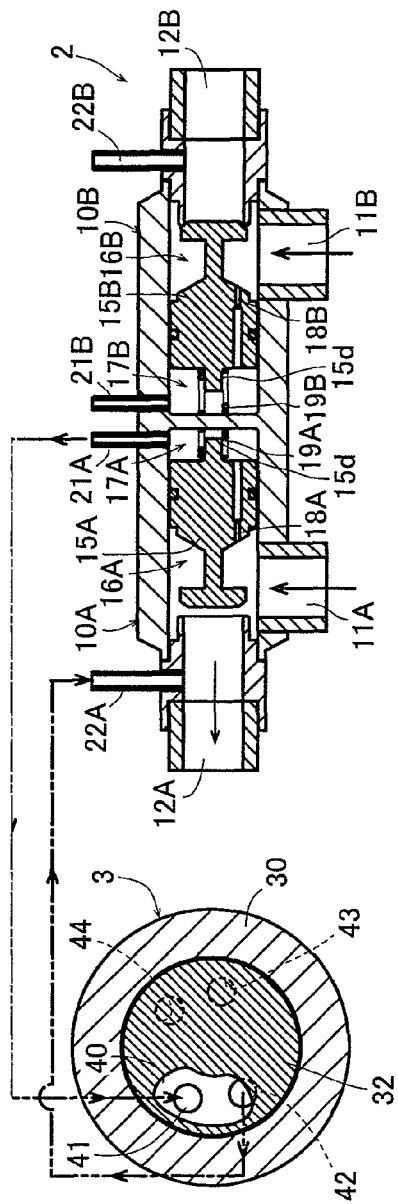

As the rotary valve member 32 is further rotated anti-clockwise from the state shown in FIG. 5B and the second port 42 is opened by about ⅔ as shown in FIG. 5C, the pressure of the back pressure chamber 17A drops further. As a result, the main valve member 15A moves to the right and is slightly separated from the main valve seat 14A, the first main valve part 10A is placed in a half open state, and the refrigerant flows out from the inlet 11A to the outlet 12A while being throttled to some extent. This period between FIGS. 5B and 5C corresponds to the period between times t2 and t3 in FIG. 8.

Figure 5D:
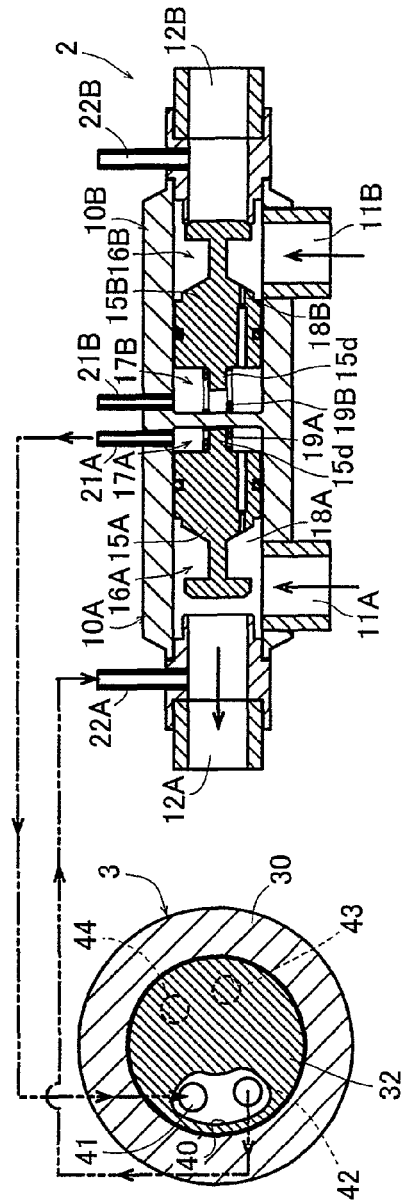

As the rotary valve member 32 is further rotated anti-clockwise from the state shown in FIG. 5C and the second port 42 is fully opened as shown in FIG. 5D, the pressure of the back pressure chamber 17A drops further. As a result, the main valve member 15A moves further to the right and is significantly separated from the main valve seat 14A, the protruding stopper 15d protruding from the rear end face thereof abuts the base part 13c, and the first main valve part 10A is placed in a fully open state. Thus, the flow reversing valve 1 is placed in the first circulatory state, and the refrigerant flows from the inlet 11A to the outlet 12A with virtually no throttling. This period between FIGS. 5C and 5D corresponds to the period between times t3 and t4 in FIG. 8.

Here, at a point when the first circulatory state, in which the first main valve part 10A is in a fully open state and the second main valve part 10B is in a fully closed state, is entered as shown in FIG. 5D, if the application of a current to the stator 38 of the motor 35 is stopped, the rotation of the rotary valve member 32 stops, the rotary valve member 32 keeps the position shown in FIG. 5D (i.e., the fully open position for the ports 41 and 42), and the flow reversing valve 1 maintains the first circulatory state. This period of the first circulatory state corresponds to the period between times t4 and t5 in FIG. 8.

Figure 6A:
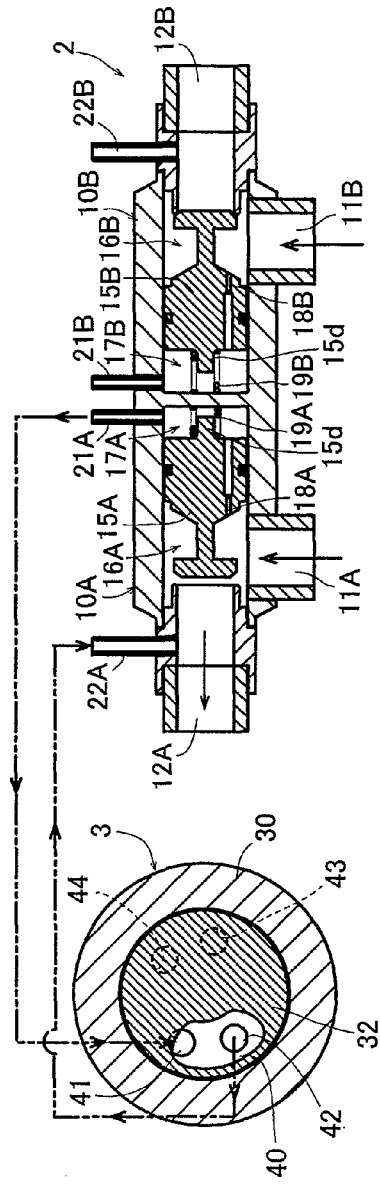
FIGS. 6A through 6D are diagrams illustrating the operation of the flow reversing valve shown in FIG. 1.

Next, as the rotary valve member 32 is further rotated anti-clockwise from the state shown in FIG. 5D and the first port 41 is slightly closed as shown in FIG. 6A, the amount of refrigerant that is released from the back pressure chamber 17A decreases. As a result, the pressure of the back pressure chamber 17A increases to some extent due to the refrigerant introduced from the pressure equalizing hole 18A, the main valve member 15A moves slightly to the left, and the first main valve part 10A is placed in a half open state. This period between FIG. 5D and FIG. 6A corresponds to the period between times t5 and t6 in FIG. 8.

Figure 6B:
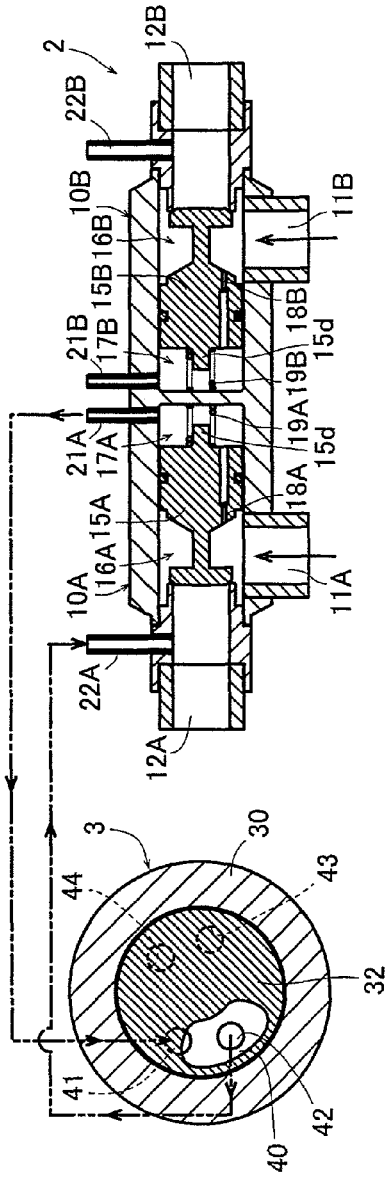

As the rotary valve member 32 is further rotated anti-clockwise from the state shown in FIG. 6A and the first port 41 is closed by about ⅔ as shown in FIG. 6B, the amount of refrigerant that is released from the back pressure chamber 17A decreases further. As a result, the pressure of the back pressure chamber 17A increases due to the refrigerant introduced from the pressure equalizing hole 18A, the main valve member 15A moves further to the left, the main valve member 15A is seated in the main valve seat 14A, and the first main valve part 10A is placed in a fully closed state. This period between FIGS. 6A and 6B corresponds to the period between times t6 and t7 in FIG. 8.

Figure 6C:
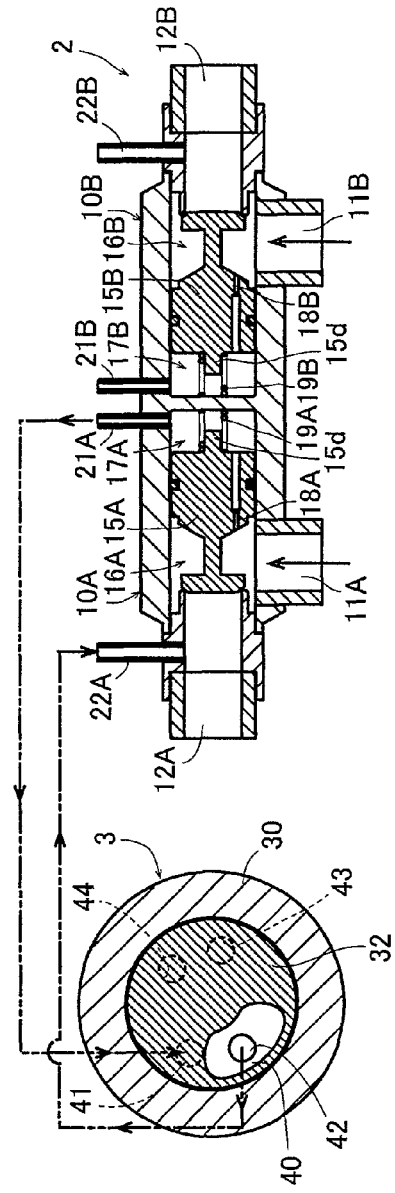

As the rotary valve member 32 is further rotated anti-clockwise from the state shown in FIG. 6B and the first port 41 is fully closed as shown in FIG. 6C, there is created a state in which, as in the state shown in FIG. 5A, none of the first port 41 and the second port 42, as well as the third port 43 and the fourth port 44, are in communication with one another, the main valve member 15A is pressed against the main valve seat 14A due to the biasing force of the valve closing spring 19A, and the first main valve part 10A and the second main valve part 10B are both placed in a fully closed state. This period between FIGS. 6B and 6C corresponds to the period between times t7 and t8 in FIG. 8.

Figure 6D:
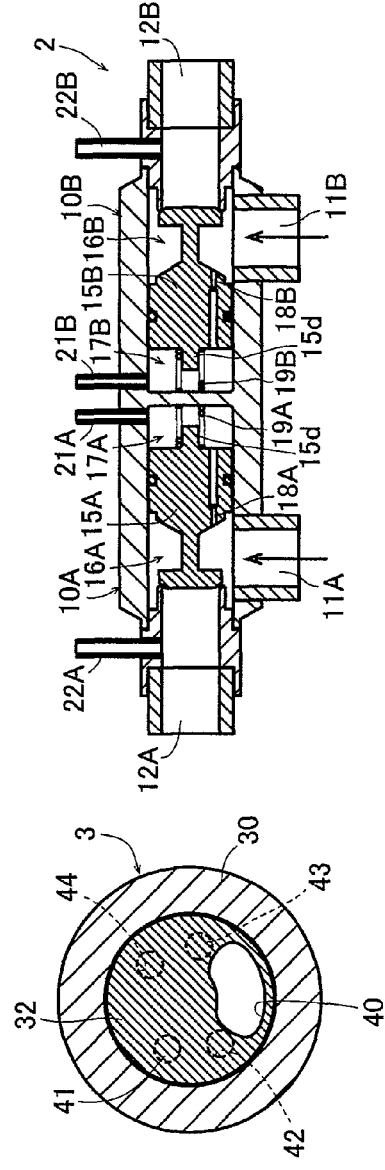

As the rotary valve member 32 is further rotated anti-clockwise from the state shown in FIG. 6C and all of the ports 41, 42, 43 and 44 are closed as shown in FIG. 6D, the first main valve part 10A and the second main valve part 10B both maintain their fully closed states.

Here, at a point when both main valve parts 10A and 10B have entered a fully closed state as shown in FIG. 6C or 6D, if the application of a current to the stator 38 of the motor 35 is stopped, the rotation of the rotary valve member 32 stops, the rotary valve member 32 keeps the position shown in FIG. 6C or 6D, and the flow reversing valve 1 maintains a state in which both main valve parts 10A and 10B are fully closed. This period corresponds to the period after time t8 in FIG. 8.

Figure 7A:
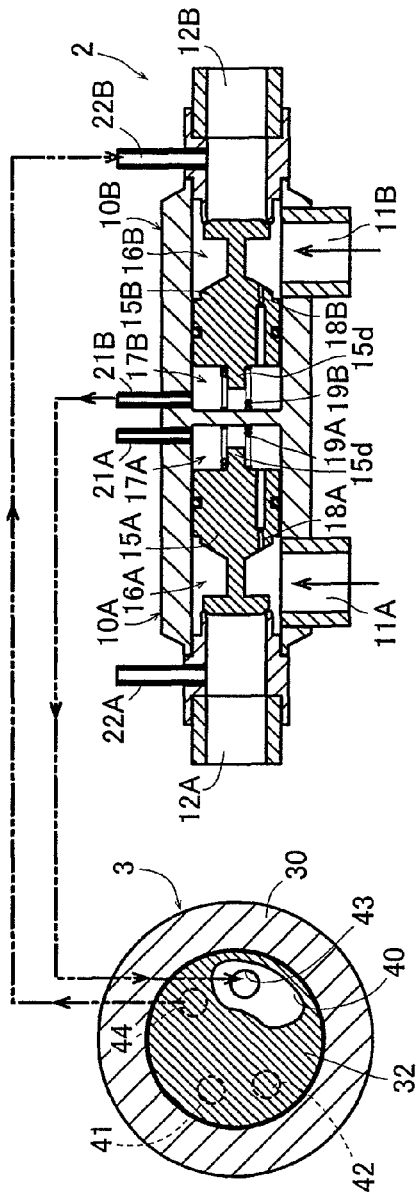
FIGS. 7A through 7D are diagrams illustrating the operation of the flow reversing valve shown in FIG. 1.
Figure 7B:
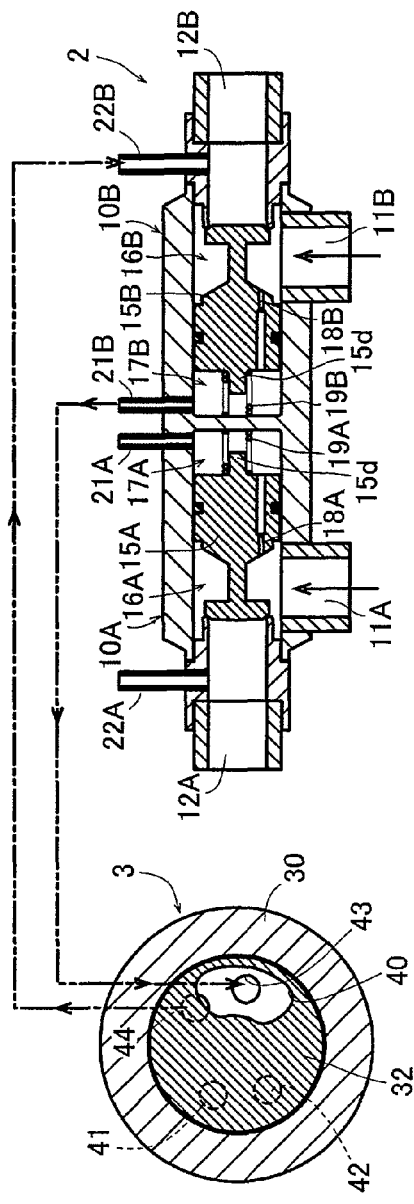
Figure 7C:
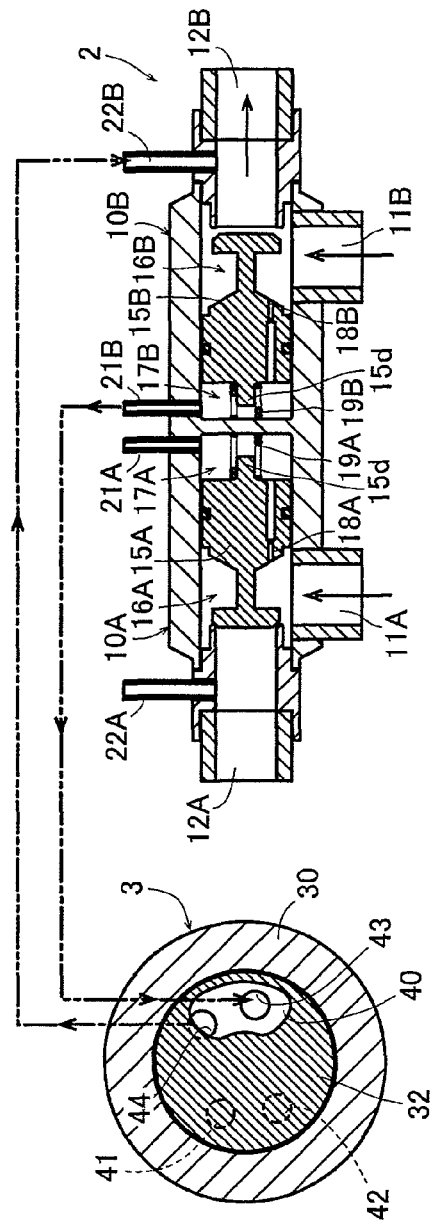
Figure 7D:
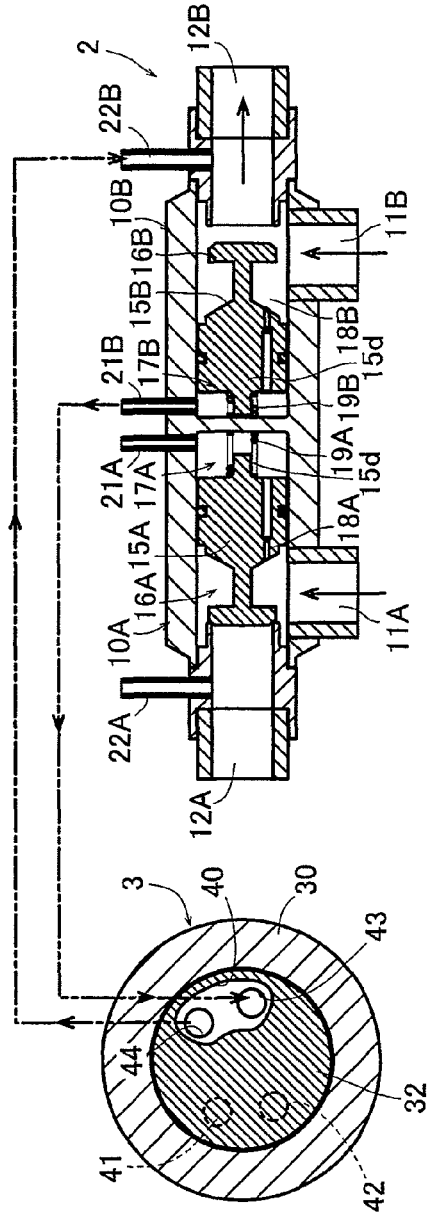
Figure 8:
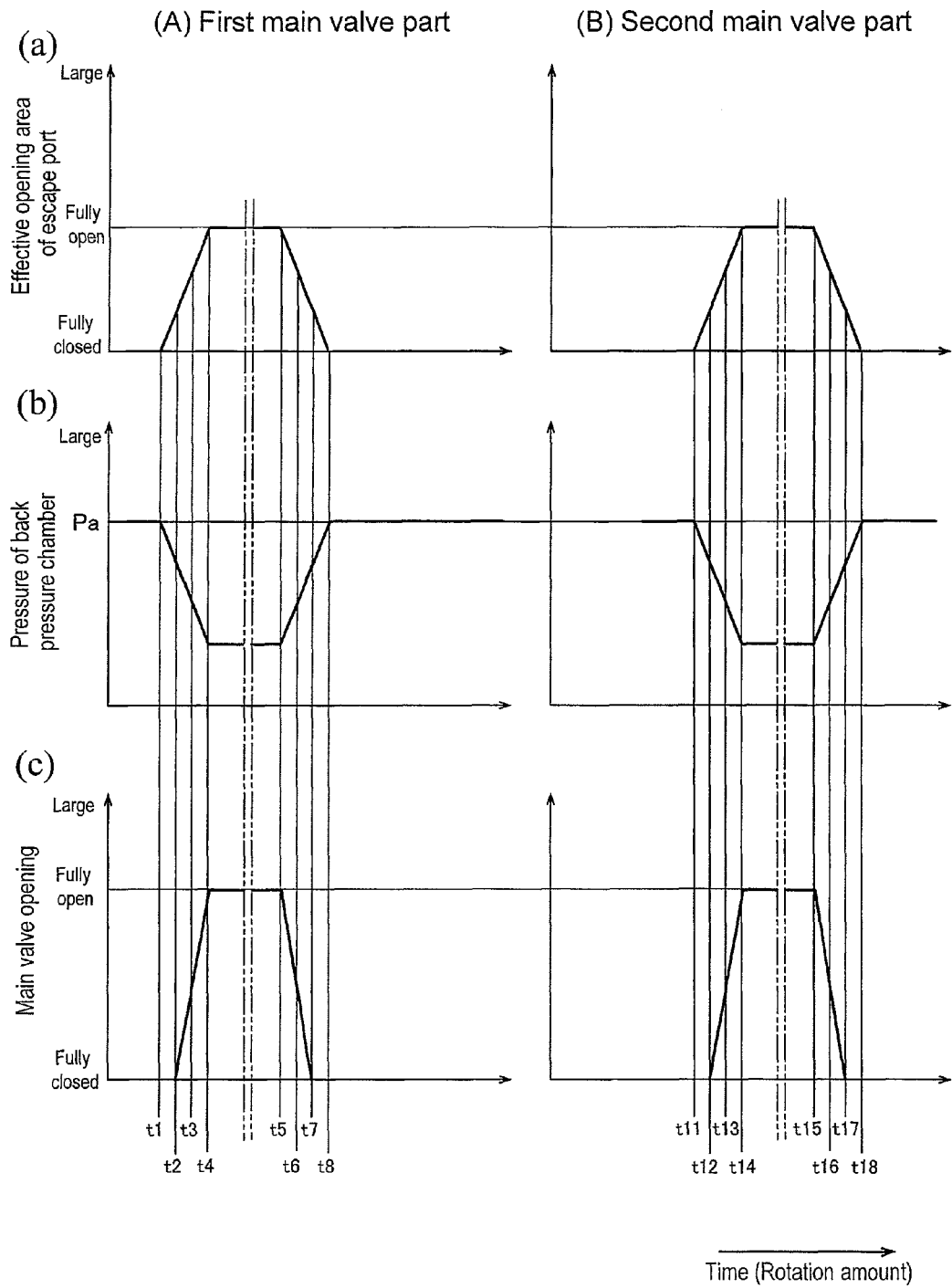
FIGS. 8A through 8C are timing diagrams illustrating the operation of the flow reversing valve shown in FIG. 1.

Next, as the rotary valve member 32 is further rotated anti-clockwise from the state shown in FIG. 6D, the second main valve part 10B, as shown in FIGS. 7A, 7B and 7C, transitions from a fully closed state to a half open state and then to a fully open state as in the first main valve part 10A shown in FIGS. 5A to 5C mentioned above. As the second main valve part 10B is placed in a fully open state as shown in FIG. 7D, the flow reversing valve 1 enters the second circulatory state. This period between FIGS. 7A and 7D corresponds to the period between times t11 and t14 in FIG. 8.

Further, as the rotary valve member 32 is further rotated anti-clockwise from the state shown in FIG. 7D, the second main valve part 10B transitions from a fully open state to a half open state and then to a fully closed state as in the first main valve part 10A shown in FIGS. 6A to 6D mentioned above. This operation of the second main valve part 10B is similar to that of the first main valve part 10A, and its description will therefore be omitted.

Thus, with the flow reversing valve 1 of the present embodiment, by regulating the excitation speed of the stator 38 of the flow regulating valve 3 (or by installing a gear reduction mechanism between the rotor 37 and the rotary valve member 32, and so forth), the rotary valve member 32 is rotated relatively slowly. The flow reversing valve 1 is thus so arranged as to be placed in the first circulatory state by gradually reducing the pressure of the back pressure chamber 17A of the first main valve part 10A, and to be placed in the second circulatory state by gradually reducing the pressure of the back pressure chamber 17B of the second main valve part 10B. As a result, it is possible to gently perform the transitions for the first main valve part 10A and the second main valve part 10B from a fully closed state to a fully open state and from a fully open state to a fully closed state (main valve opening/closing operation), as well as the switches from the first circulatory state to the second circulatory state and from the second circulatory state to the first circulatory state (flow reversing operation). Accordingly, it is possible to effectively suppress occurrences of flood backs, impact sounds, etc., and to thereby prevent system failures, etc.

In addition, since there is no need to apply a current to the flow regulating valve 3 once the rotary valve member 32 has been placed in a certain position, such as after flow reversal, etc., it is possible to reduce power consumption relative to valves of an electromagnetic type.

Further, since the flow regulating valve 3 is so arranged as to serve as a pilot valve for both main valve parts 10A and 10B, flow reversal can be performed with a smaller driving force as compared to conventional valves of an electromagnetic type. Accordingly, it is possible to reduce energy consumption, such as power consumption, etc., from this point as well.

It is noted that the flow reversing operation speed and the main valve opening/closing operation speed may be adjusted in accordance with the specifications of the heat pump system, etc., in which this flow reversing valve is to be employed.

In addition, in the embodiment above, a single rotary four-port flow regulating valve 3 is used as a back pressure regulating means. However, a four-port flow regulating valve of a kind other than a rotary valve may be used, or two two-port flow regulating vales, etc., may be used in its place. Further, as a back pressure regulating means, two two-way valves (ON/OFF valves), etc., may be used in place of the flow regulating valve so as to only perform the flow reversing operation, or the main valve opening/closing operation, gently.

Further, with respect to the flow revering valve 1 of the embodiment above, two inlets and two outlets are provided. However, if the present flow reversing valve 1 is to be used as a three-way reversing valve, the inlets 11A and 11B may be combined into one inlet using a tee fitting, etc., or the outlets 12A and 12B may be combined into one outlet using a tee fitting, etc., for example.

Next, an example will be described with reference to FIGS. 4A and 4B where the flow reversing valve 1 in the embodiment above is used as three-way reversing valves (100A and 100B) in the heat pump device 200 shown in FIG. 9 previously discussed.

In the heat pump device 200' in the illustrated example, a first flow reversing valve 1A of the same structure as the embodiment above is disposed between the discharge side of the compressor 210 and the condenser 220, and a second flow reversing valve 1B of the same structure as the embodiment above is disposed between the evaporator 230 and the suction side of the compressor 210.

More specifically, with respect to the first flow reversing valve 1A, the inlet 11A of the first main valve part 10A and the inlet 11B of the second main valve part 10B are each connected to the discharge side of the compressor 210 via a tee fitting 310, etc., the outlet 12A of the first main valve part 10A is connected to the condenser 220, and the outlet 12B of the second main valve part 10B is connected to the evaporator 230.

On the other hand, with respect to the second flow reversing valve 1B, the inlet 11A of the first main valve part 10A is connected to the evaporator 230, the inlet 11B of the second main valve part 10B is connected to the condenser 220, and the outlet 12A of the first main valve part 10A and the outlet 12B of the second main valve part 10B are each connected to the suction side of the compressor 210 via a tee fitting 320, etc.

Figure 4A:
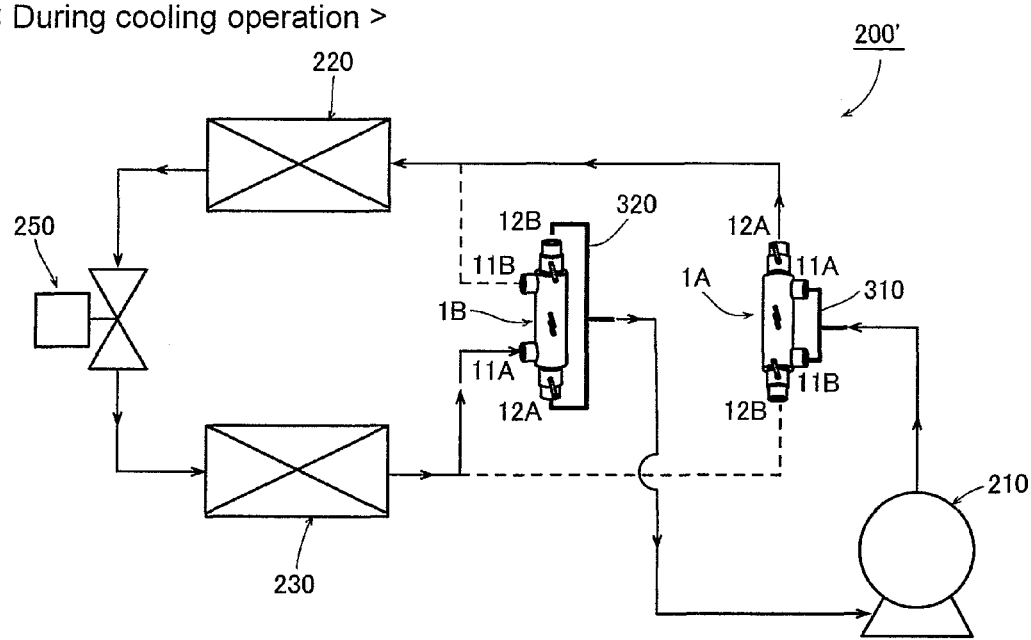
FIGS. 4A and 4B are diagrams showing schematic cycle examples of a heat pump device employing the flow reversing valve shown in FIG. 1.

With the heat pump device 200' above, by controlling the flow regulating valve, during cooling operation, as shown in FIG. 4A, the first flow reversing valve 1A assumes the first circulatory state, and the second flow reversing valve 1B also assumes the first circulatory state. The refrigerant discharged from the compressor 210 thus flows as follows: the inlet 11A of the first flow reversing valve 1A→the outlet 12A of the first flow reversing valve 1A→the condenser 220 the expansion valve 250→the evaporator 230→the inlet 11A of the second flow reversing valve 1B→the outlet 12A of the second flow reversing valve 1B→the suction side of the compressor 210.

Figure 4B:
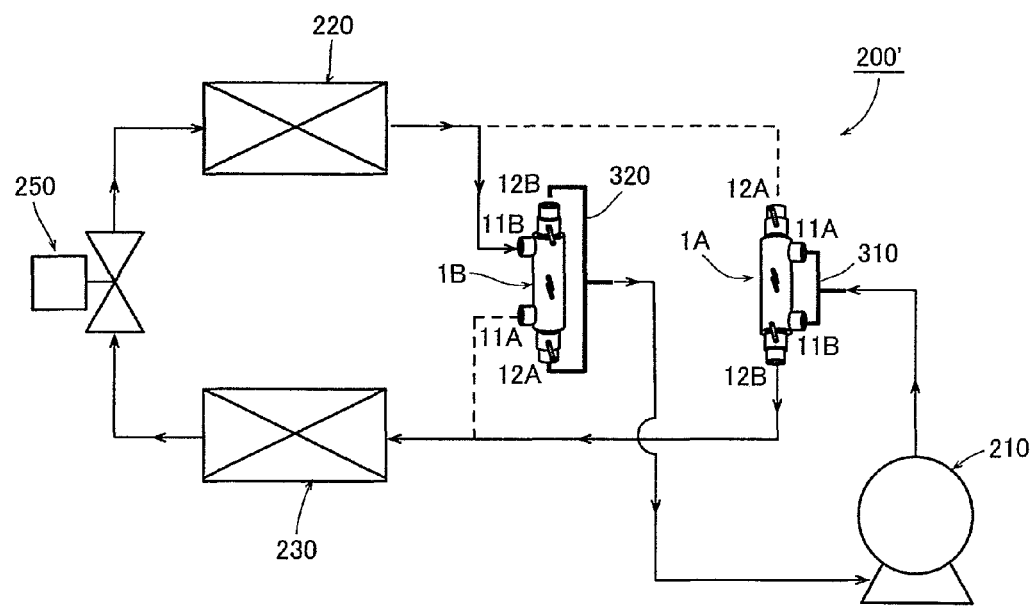

In contrast, during heating operation, as shown in FIG. 4B, the first flow reversing valve 1A assumes the second circulatory state, and the second flow reversing valve 1B also assumes the second circulatory state. The refrigerant discharged from the compressor 210 thus flows as follows: the inlet 11B of the first flow reversing valve 1A→the outlet 12B of the first flow reversing valve 1A→the evaporator 230→the expansion valve 250→the condenser 220→the inlet 11B of the second flow reversing valve 1B→the outlet 12B of the second flow reversing valve 1B→the suction side of the compressor 210.

It is thus possible to have the flow reversing function of a four-way reversing valve provided by using two of the flow reversing valves 1 of the embodiment above in a heat pump device.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A flow reversing valve, comprising:
a reversing valve main body including:
a first main valve part and a second main valve part in each of which an inlet, an outlet, a main valve chamber, and a back pressure chamber are formed;
a first main valve member that is fitted in a freely slidable manner between the main valve chamber and the back pressure chamber of the first main valve part;
a second main valve member that is fitted in a freely slidable manner between the main valve chamber and the back pressure chamber of the second main valve part; and
a pressure equalizing hole that is formed in each of the first main valve member and the second main valve member to communicate the main valve chamber with the back pressure chamber, the reversing valve main body being adapted to be capable of assuming a first circulatory state in which the first main valve part is in a fully open state and the second main valve part is in a fully closed state, and a second circulatory state in which the first main valve part is in a fully closed state and the second main valve part is in a fully open state; and back pressure regulating means adapted to regulate the pressure of each of the back pressure chambers of the first main valve part and the second main valve part;
wherein the back pressure regulating means is adapted to regulate the pressure of the back pressure chamber by an amount of fluid between the back pressure chamber and the outlet so as to place the reversing valve main body in the first circulatory state by reducing the pressure of the back pressure chamber of the first main valve part, and in the second circulatory state by reducing the pressure of the back pressure chamber of the second main valve part; and
wherein the back pressure chambers of the first and second main valve parts are arranged symmetrically on opposing sides of and are separated by a shared base.

2. The flow reversing valve of claim 1, wherein:
each of the first main valve part and the second main valve part further comprises a tubular main valve case with a base;
in each of the main valve cases, a main valve seat having a main valve opening is provided and the first main valve member and the second main valve member adapted to open/close the main valve opening are fitted in a freely slidable manner,
between the main valve seat and the first and second main valve members are formed the main valve chamber and the inlet, the inlet opening into the main valve chamber;
the outlet is formed downstream of the main valve opening; and
the back pressure chamber is formed between the base of the main valve case and the first main valve member and the second main valve member.

3. The flow reversing valve of claim 2, wherein a valve closing spring adapted to constantly bias the first main valve member and the second main valve member in a valve closing direction is disposed in each of the back pressure chambers of the first main valve part and the second main valve part.

4. The flow reversing valve of claim 1, wherein the back pressure regulating means comprises one or two flow regulating valves that are capable of regulating the amount of fluid that is released from the back pressure chamber to the outlet in each of the first main valve part and the second valve part.

5. A heat pump device, comprising:
a compressor,
a condenser,
an evaporator,
an expansion valve, and
first and second flow reversing valves, each of the first and second flow reversing valves comprising:
a reversing valve main body including:
a first main valve part and a second main valve part in each of which an inlet, an outlet, a main valve chamber, and a back pressure chamber are formed;
a first main valve member that is fitted in a freely slidable manner between the main valve chamber and the back pressure chamber of the first main valve part;
a second main valve member that is fitted in a freely slidable manner between the main valve chamber and the back pressure chamber of the second main valve part; and
a pressure equalizing hole that is formed in each of the first main valve member and the second main valve member to communicate the main valve chamber with the back pressure chamber, the reversing valve main body being adapted to be capable of assuming a first circulatory state in which the first main valve part is in a fully open state and the second main valve part is in a fully closed state, and a second circulatory state in which the first main valve part is in a fully closed state and the second main valve part is in a fully open state; and back pressure regulating means adapted to regulate the pressure of each of the back pressure chambers of the first main valve part and the second main valve part;

wherein the back pressure regulating means is adapted to regulate the pressure of the back pressure chamber by an amount of fluid between the back pressure chamber and the outlet so as to place the reversing valve main body in the first circulatory state by reducing the pressure of the back pressure chamber of the first main valve part, and in the second circulatory state by reducing the pressure of the back pressure chamber of the second main valve part;

wherein the back pressure chambers of the first and second main valve parts are arranged symmetrically on opposing sides of and are separated by a shared base;

wherein the first flow reversing valve is disposed between a discharge side of the compressor and the condenser; and wherein the second flow reversing valve is disposed between the evaporator and a suction side of the compressor.

6. The heat pump device of claim 5, wherein:

with respect to the first flow reversing valve, the inlet of the first main valve part and the inlet of the second main valve part are each connected to the discharge side of the compressor, and one of the outlet of the first main valve part and the outlet of the second main valve part is connected to the condenser while the other is connected to the evaporator; and with respect to the second flow reversing valve, one of the inlet of the first main valve part and the inlet of the second main valve part is connected to the condenser while the other is connected to the evaporator, and the outlet of the first main valve part and the outlet of the second main valve part are each connected to the suction side of the compressor.

7. A reversing valve main body, comprising:

a first main valve part and a second main valve part in each of which an inlet, an outlet, a main valve chamber, and a back pressure chamber are formed, wherein:

each of the first main valve part and the second main valve part comprise a tubular main valve case with a base, in each of the tubular main valve cases a main valve seat having a main valve opening is provided, the inlet opening into the main valve chamber is formed, and the outlet is formed downstream of the main valve opening, a first main valve member that is fitted in a freely slidable manner between the main valve chamber and the back pressure chamber of the first main valve part; and a second main valve member that is fitted in a freely slidable manner between the main valve chamber and the back pressure chamber of the second main valve part;

wherein the reversing valve main body is adapted to be capable of assuming a first circulatory state in which the first main valve part is in a fully open state and the second main valve part is in a fully closed state, and a second circulatory state in which the first main valve part is in a fully closed state and the second main valve part is in a fully open state by the first main valve member and the second main valve member; and wherein the back pressure chambers of the first and second main valve parts are arranged symmetrically on opposing sides of and are separated by a shared base.

8. A heat pump device, comprising:

a compressor, a condenser, an evaporator, an expansion valve, and first and second flow reversing valves, each of the first and second flow reversing valves comprising a reversing valve main body which includes:

a first main valve part and a second main valve part in each of which an inlet, an outlet, a main valve chamber, and a back pressure chamber are formed, wherein:

each of the first main valve part and the second main valve part comprise a tubular main valve case with a base, in each of the tubular main valve cases a main valve seat having a main valve opening is provided, the inlet opening into the main valve chamber is formed, and the outlet is formed downstream of the main valve opening, a first main valve member that is fitted in a freely slidable manner between the main valve chamber and the back pressure chamber of the first main valve part; and a second main valve member that is fitted in a freely slidable manner between the main valve chamber and the back pressure chamber of the second main valve part;

wherein the reversing valve main body is adapted to be capable of assuming a first circulatory state in which the first main valve part is in a fully open state and the second main valve part is in a fully closed state, and a second circulatory state in which the first main valve part is in a fully closed state and the second main valve part is in a fully open state by the first main valve member and the second main valve member;

wherein the back pressure chambers of the first and second main valve parts are arranged symmetrically on opposing sides of and are separated by a shared base;

wherein the first flow reversing valve is disposed between a discharge side of the compressor and the condenser; and wherein the second flow reversing valve is disposed between the evaporator and a suction side of the compressor.

9. The flow reversing valve of claim 1, wherein the first main valve member and the second main valve member are arranged symmetrically on opposing sides of the shared base.

10. The reversing valve main body of claim 7, wherein the tubular main valve cases of the first and second main valve parts are arranged symmetrically on opposing sides of the shared base, the shared base being shared by the tubular main valve cases of the first and second main valve parts.

11. The reversing valve main body of claim 10, wherein the tubular main valve cases of the first and second main valve parts are integrated back-to-back to share the shared base.

* * * * *